United States Patent [19]

Belanger

[11] Patent Number: 4,630,510
[45] Date of Patent: Dec. 23, 1986

[54] TACTILE ENGAGING WRENCHING MECHANISM

[75] Inventor: Victor Belanger, Huntington Beach, Calif.

[73] Assignee: Monogram Industries, Inc., Culver City, Calif.

[21] Appl. No.: 608,765

[22] Filed: May 10, 1984

[51] Int. Cl.$^4$ ............................................. B25B 13/50
[52] U.S. Cl. ............................................. 81/55; 72/391
[58] Field of Search ............... 81/55, 56; 72/114, 115, 72/391

[56] References Cited

U.S. PATENT DOCUMENTS

| 2,789,597 | 4/1957 | Torre | 81/55 |
| 3,323,394 | 6/1967 | Bangerter et al. | 81/55 X |
| 4,368,631 | 1/1983 | Tanikawa | 72/391 X |

Primary Examiner—James G. Smith
Attorney, Agent, or Firm—Pretty, Schroeder, Brueggemann & Clark

[57] ABSTRACT

A tactile engaging wrenching tool adapted for use in the installation of blind bolt fasteners. The wrenching tool includes a wrench adaptor for engaging the fastener screw and a nose-piece for holding the fastener head while the screw is turned to set the fastener. A clutch assembly is provided which transmits a light torque load to the wrench adaptor while the nose-piece is engaging the nut head. The clutch assembly is designed to provide a high torque load to the wrench adaptor to turn the screw and seat the fastener only after the nose-piece has been biased into a secure engagement with the fastener. The wrenching tool mechanism is especially well-suited for use in systems for automatic installation of blind bolt fasteners.

20 Claims, 15 Drawing Figures

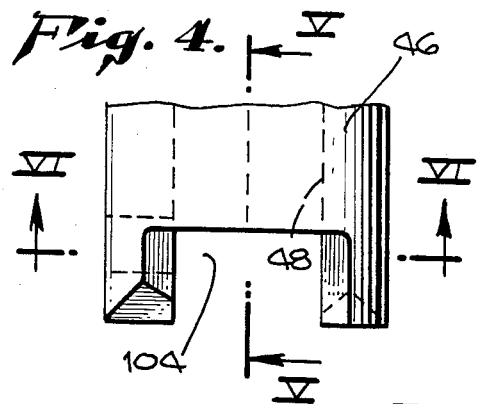
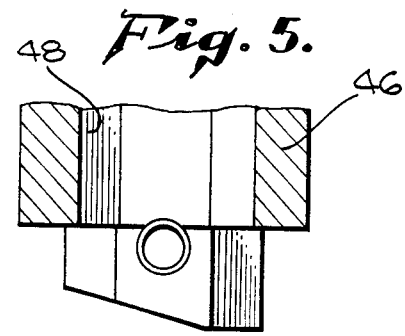
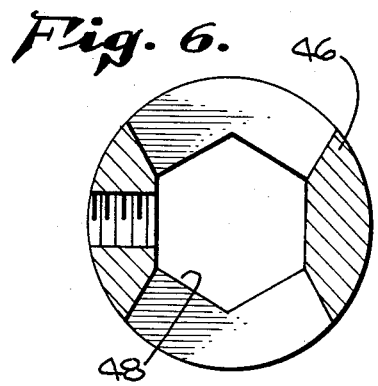
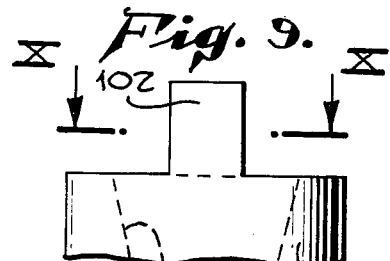
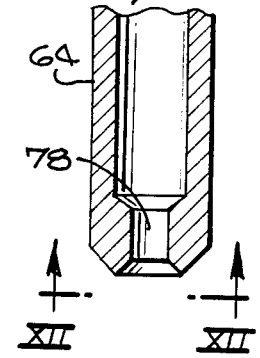
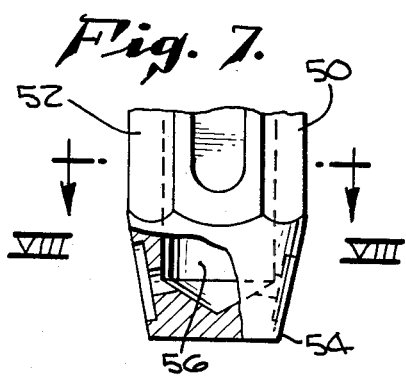
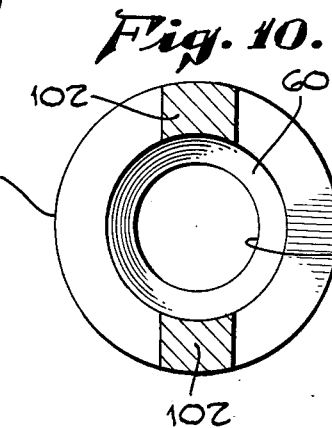
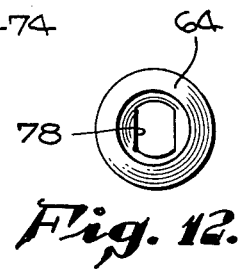
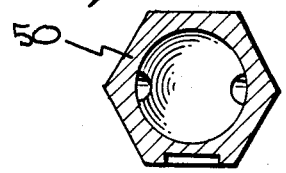
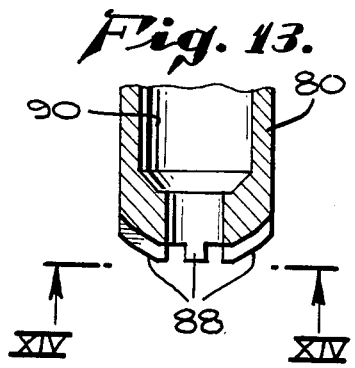
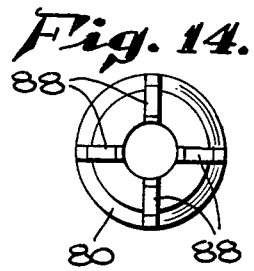

TACTILE ENGAGING WRENCHING MECHANISM

BACKGROUND OF THE INVENTION

The present invention relates generally to mechanisms and tools for the installation of fasteners such as blind bolt fasteners or rivets. More particularly, the present invention relates to mechanisms for automatic installation of the fasteners.

Blind bolt fasteners are commonly used for fastening sheet metal and other structures together. The fasteners typically includes a nut in which a screw is mounted. Installation of the fastener is accomplished by inserting the fastener into a common opening in the structure(s) to be fastened and turning the screw relative to the nut to deform the fastener in a manner to fasten the structures together.

In general, the fastener must have two wrenching surfaces which are engaged by the installation tooling. These wrenching surfaces typically include two flat portions on the end of the screw and a Phillips-type recess in the head of the nut (see FIG. 1A). To install this type of fastener, a non-rotating nose-piece is inserted into the Phillips-type recess in the head of the nut and a rotating driver or wrench adaptor located inside of the nose-piece engages the flats on the screw. The screw is then rotated relative the nut-head to install the fastener.

With hand-held tooling, the proper alignment of the nose-piece and wrench adaptor on the fastener presents no problem. The person installing the fastener inserts it in the hole in the sheet metal or other structure and then carefully adjusts the position of the nose-piece and wrench adaptor so that both wrenching surfaces are securely engaged. The air motor or other drive mechanism is then turned on to install the fastener.

In many situations, automatic installation of fasteners is desirable. Automatic installation of the fasteners presents problems which are not encountered when the fasteners are manually installed. More particularly, during automatic installation of fasteners, the fastener is automatically placed in a pre-drilled hole in the sheet metal or other surface to be fastened. The wrench adaptor inside the nose-piece must be rotating when the wrenching tool is connected to the fastener in order to align its internal drive recess with the flats on the screw. When the wrench adaptor does engage the screw, it causes the fastener to rotate in the hole before the nose-piece engages the recess in the head of the nut. As the nose-piece moves into engagement with the spinning nut, the Phillips-type recess can be distorted and damaged. Many times, the nose-piece will strip or machine the Phillips-type recess to such an extent that the damaged fastener cannot be installed. When this happens, the automatic equipment must be shut down and the damaged fastener removed by hand.

It would be desirable to provide a wrenching tool which can be used for automatic installation of fasteners which automatically and positively engage both the wrench adaptor and nose-piece with the fastener to drive the fastener into place without damaging the recess in the nut head.

SUMMARY OF THE INVENTION

In accordance with the present invention, a tactile engaging wrenching tool is disclosed which is particularly well-suited for automatic installation of blind fasteners. The wrenching tool overcomes the above mentioned problems and provides a mechanism which automatically aligns with and positively engages both the fastener screw and nut to achieve automatic fastener installation without damaging the fastener.

The present invention is based upon a tactile engaging wrenching tool which includes a wrench adaptor having a bottom end adapted to engage the wrench portion of the fastener screw to provide common only rotation of the screw and wrench adaptor. A nose-piece is provided having a bottom end adapted to engage the nut head recess to hold the nut head stationary while the wrench adaptor is engaged to and turns the screw to install the fastener. Means for biasing the nose-piece bottom end against the nut head recess to provide positive engagement of the nose-piece with the nut head is provided. The biasing means are operable between a biased position in which sufficient force is exerted by the nose-piece against the nut head recess to provide positive engagement and an unbiased position.

The wrenching tool in accordance with the present invention further includes a drive motor which is connectable to the wrench adaptor to provide the necessary torque to turn the screw when the nut is held stationary. Variable torque transfer means are provided for connecting the drive motor to the wrench adaptor with the variable torque means being operable between a low torque transfer mode and a high torque transfer mode. As a particular feature of the present invention, the variable torque transfer means is operable in the high torque transfer mode only when the nose-piece biasing means is in the biasing position to ensure positive engagement of the nose-piece with the fastener. Prior to the positive engagement of the nose-piece with the nut head, the variable torque transfer means remains in the low torque transmission mode. In this low torque transfer mode, the wrench adaptor, when connected to the screw, turns the nut into alignment for engagement with the nose-piece. Once the nose-piece engages the nut, the wrench adaptor stops turning until the nose-piece is positively engaged with the nut. Once the nose-piece is positively engaged due to the nose-piece biasing means, greater torque transfer from the drive motor is provided by the variable torque means to turn the screw and seat the fastener.

The above-discussed and many other features and attendant advantages of the present invention will become apparent as the invention becomes better understood by reference to the following detailed description when considered in conjunction with the accompanying drawings.

BRIEF DESCRIPTION OF THE DRAWINGS

FIG. 4 is a partial view of the lower portion of the drive shaft which is connected to the drive motor and is part of the direct drive means for providing a direct connection between the drive motor and the wrench adaptor.

FIG. 5 is a sectional view of FIG. 4 taken V—V plane.

FIG. 6 is a sectional view of FIG. 4 taken in the VI—VI plane.

FIG. 7 is a partial sectional view of the lower portion of the first clutch member.

FIG. 8 is a sectional view of FIG. 7 taken in the in the VIII—VIII plane.

FIG. 9 is a partial view of the top portion of the slip clutch.

FIG. 10 is a sectional view of FIG. 9 taken in the X—X plane.

FIG. 11 is a sectional view of the lower portion of the wrench adaptor.

FIG. 12 is a view of FIG. 11 taken in the XII—XII plane.

FIG. 13 is a sectional view of the lower portion of the nose-piece.

FIG. 14 is a view of FIG. 13 taken in the XIV—XIV plane.

DETAILED DESCRIPTION OF THE INVENTION

Figure 1:
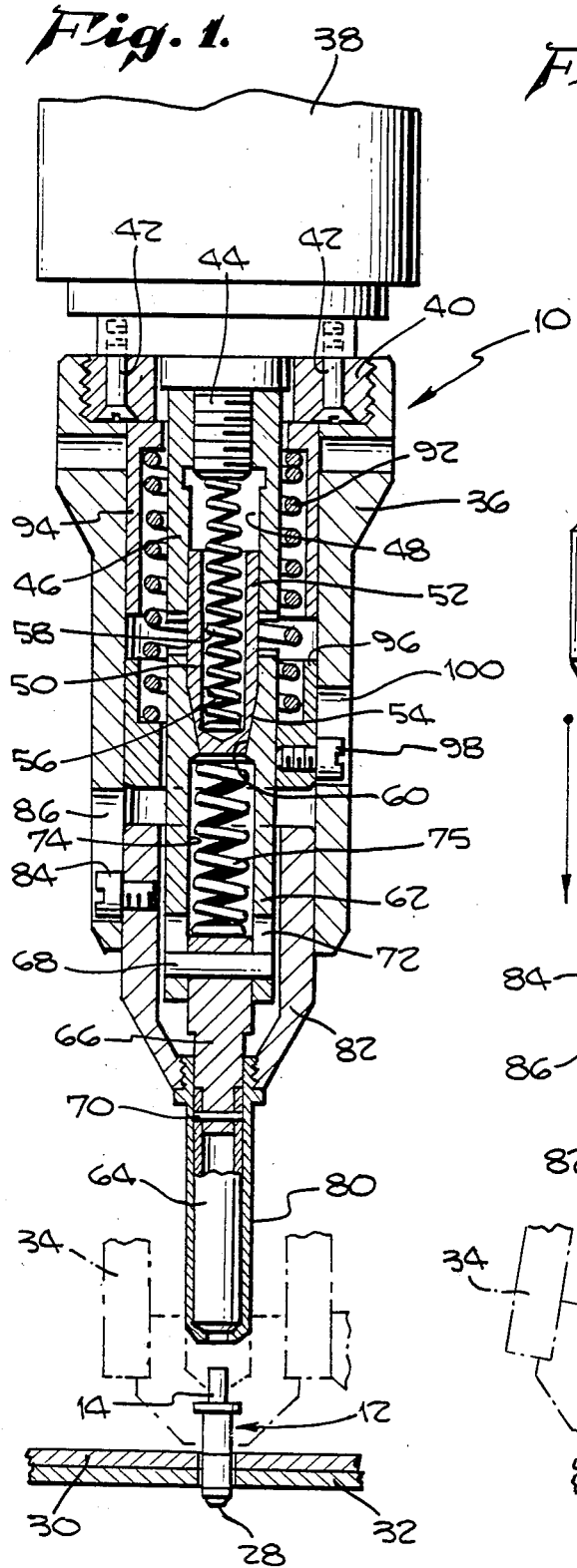
FIG. 1 is a partial sectional view of a preferred wrenching tool in accordance with the present invention. The tool is shown just prior to engagement with a fastener.
Figure 2:
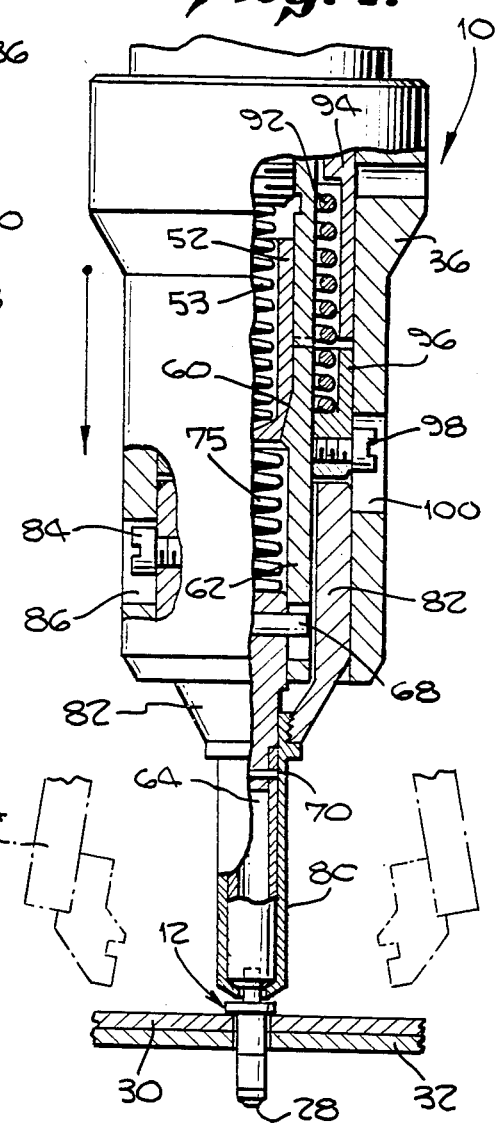
FIG. 2 is a partial cross-sectional view of the wrenching tool shown in FIG. 1 with the tool being in the position where the nose-piece is positively engaged with the fastener.
Figure 3:
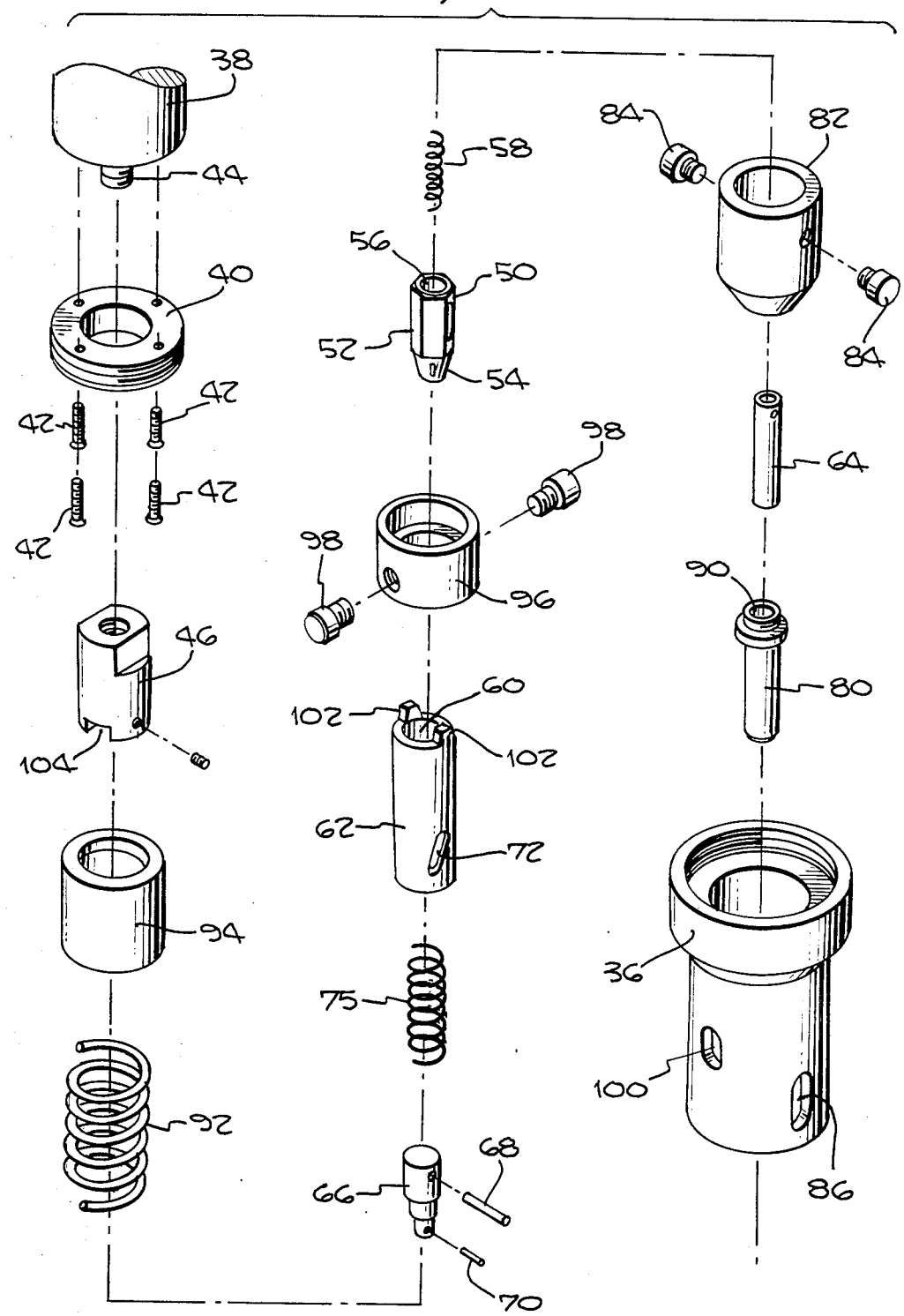
FIG. 3 is an exploded view of the preferred wrenching tool shown in FIGS. 1 and 2.

An exemplary embodiment of a preferred tactile engaging tool for automatic installation of fasteners is shown generally at 10 in FIGS. 1 and 2. An exploded view of the wrenching tool mechanism is shown in FIG. 3.

Figure 1A:
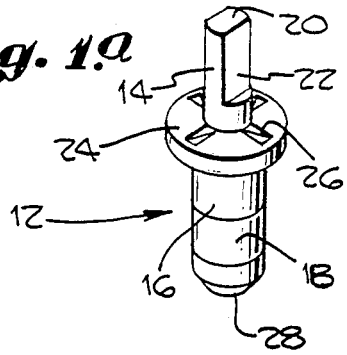
FIG. 1a is a perspective view of a typical fastener which can be installed by the wrenching tool in accordance with the present invention.

The wrenching tool is designed to install fasteners of the type shown generally at 12 in FIG. 1a. The fastener 12 includes a screw 14, nut 16 and collar 18. The screw 14 includes a wrench portion 20 which has flats 22. Screws having wrench portions with hexagonal cross sections or splines instead of flats are also suitable. The nut 16 includes a head portion 24 in which a Phillips-type recess 26 is provided. The screw 14 is threaded through the nut 16 and connected at its lower end to collar 18. The nut can also be a hex head or other configuration which allows mating engagement with a socket.

To install the fastener 12, it is first inserted into a common opening in the structures which are to be fastened together and then the screw 20 is turned relative the nut 16 to pull collar 18 up against the nut 16 to provide the desired deformation of the collar which results in fastening of the structures together.

A fastener of the type shown in FIG. 1a is depicted in FIGS. 1 and 2 at 28. In FIG. 2 the fastener 28 is shown in position to fasten two plate structures 30 and 32 together. The fastener 28 is shown inserted through a common opening in plates 30 and 32 with the fastener nut being of sufficient length so that when the collar is deformed, it will securely fasten the plates together.

The wrenching tool 10 is especially well-suited for use in the automatic installation of fasteners. Accordingly, an automatic positioning device 34 is provided for positioning the fastener 28 for installation. Any suitable automatic positioning device can be utilized so long as it provides quick and accurate placement of the fastener 28 without interfering with the action of the wrenching tool 10 or the structure to be joined 30 and 32.

The wrenching tool 10 basically includes an outer housing 36 which is connected to a drill motor 38 by way of a collar 40 and screws 42. The drill motor may be any suitable drive means such as an air driven or electrically driven drill. The drill motor 38 includes a rotor shaft 44 which is connected by way of a threaded engagement to drive shaft 46. The drive shaft 46 includes an opening 48 which has a hexagonal cross section as best shown in FIG. 6. Hex spline 50 includes a main body portion 52, conical clutch face 54 and internal cavity 56. The main body portion 52 of the hex spline is hexagonally shaped so that it slidably fits within the drive shaft opening 48. A spring 58 is positioned within the internal cavity 56 to bias the conical clutch surface 54 against a mating conical clutch surface 60 in slip clutch or transfer shaft 62.

The slip clutch 62 is connected for common rotation only to the wrench adaptor 64 by way of slip clutch adaptor 66 and connecting pins 68 and 70. The connecting pin 68 is mounted within groove 72 in the slip clutch. The groove is angled as best shown in FIG. 3 to absorb a portion of the shock transmitted from drive shaft 46 to the wrench adaptor 64 when the drive shaft 46 directly engages slip clutch 62 as will be described below.

The slip clutch 62 includes an internal cavity 74 in which a spring is housed for biasing the conical clutch surface 60 against the conical clutch surface 54 of hex spline 50.

As shown in FIG. 1, the drive shaft 46 is connected to the wrench adaptor 64 through the clutch surfaces 54 and 60. The amount of torque transmitted from the drill motor 38 to the wrench adaptor 64 will therefore be determined by the nature of the surfaces, the contact surface area between the conical surfaces 54 and 60 and the amount of spring 75 biasing provided by springs 58 and 75. Preferably, the amount of torque transmitted through the conical clutch surfaces 54 and 60 to the wrench adaptor 64 should be sufficient to turn the screw 14 while the nut 16 is free to rotate. However, once the nut 16 is held stationary by engagement with the nose-piece 80, the conical clutch surfaces 54 and 62 should slip relative each other to reduce the possibility of damage to the Phillips-type recess 26 as the nose-piece 80 is inserted into the nut head 24.

The wrench adaptor 64 may be provided with any convenient means for engaging the fastener screw. Typically, the wrench adaptor 64 will have an oblong opening 78 as best shown in FIG. 12 for mating engagement with the flat portions, such as flats 22, on conventional fastener screws.

The nose-piece 80 is securely mounted to the outer housing 36 by way of a threaded engagement with sliding housing 82. The sliding housing 82 is secured to the outer housing 36 by way of set screw 84 which is mounted within slot 86 to allow longitudinal movement only of the nose-piece 80 relative the outer housing 36. The nose-piece 80 includes a lower portion having protrusions 88 designed to engage the Phillips-type recess 26 in fastener 28 (see FIGS. 13 and 14). The nose-piece 80 further includes a central passageway 90 through which the wrench adaptor 64 may travel longitudinally for engagement with the fastener screw 20.

As shown in FIG. 1, the wrenching tool 10 is positioned over the fastener 28 with the wrench adaptor being turned by the drill motor 38 via the above described clutch assembly arrangement. The nose-piece 80 does not rotate since it is securely connected to housing 36. The wrenching tool is moved downward toward the fastener so that the wrench adaptor 64 engages the fastener 28 as shown in FIG. 2. At this point, the entire fastener begins turning. The wrenching tool 10 is continually moved downward until the nose-piece 80 aligns with and engages the Phillips-type recess 26. At this point, the fastener is held stationary so that the conical clutch surface 54 which is driven by motor 38 begins to slip relative the conical clutch surface 60 which is now stationary. The amount of torque transmitted to the wrench adaptor will remain at this low level until the nose-piece 80 is biased securely into the Phillips-type recesses 26.

Nose-piece biasing spring 92 is mounted within spring housings 94 and 96. Spring housing 96 is secured to outer housing 36 by way of set screw 98 and slot 100. As the wrenching tool 10 is continually moved downward against fastener 28, the sliding housing 82 is forced against spring housing 96, resulting in compression of spring 92. The compression of spring 92 biases and holds the nose-piece 80 in its engagement with the fastener nut head 24. The spring 92 is designed to provide sufficient biasing when compressed (as shown in FIG. 2) to prevent the nose-piece 80 from slipping out of or otherwise disengaging from the Phillips-type recesses in fastener 28.

As the sliding housing 82 and spring housing 96 are moved upward into their compressed positions as shown in FIG. 2, the slip clutch 62 is also moved upward into contact with drive shaft 46. The slip clutch 62 includes tabs 102 which are designed to engage slot 104 in drive shaft 46 (FIG. 3). The engagement of tabs 102 with slot 104 provides a direct connection between the drill motor shaft 44 and the wrench adaptor 64. The amount of torque provided by the drill motor is sufficient to turn the screw 20 while the nut 16 is being held stationary by nose-piece 80 to thereby deform the collar 18 into the desired shape for fastening.

As can be seen, the above described mechanism provides the transfer of variable torque to the wrench adaptor 64. When the wrenching tool is in the position shown in FIG. 1, the amount of torque transferable to the wrench adaptor 64 is limited to a low level by the clutch-type engagement between hex spline 50 and slip clutch 62. When the wrenching tool 10 is moved to the position shown in FIG. 2, wherein the nose-piece 80 is positively and securely biased into the Phillips-type recesses in the nut 16, the slip clutch 62 is directly connected to the drive shaft 46 to provide the increased torque necessary to deform the fastener. The direct, no slip engagement of slip clutch 62 to drive shaft 46 occurs only after the nose-piece 80 has been biased by spring 92 into positive engagement with the fastener 28. By applying increased torque to the screw only after secure positioning of the nose-piece into the Phillips-type recesses overcomes the previously mentioned problems wherein the fastener nut is damaged during insertion of the nose-piece into the fastener head.

Having thus described exemplary embodiments of the present invention, it should be noted by those skilled in the art that the within disclosures are exemplary only and that various other alternatives, adaptations and modifications may be within the scope of the present invention. For example, instead of a recess being provided in the nut for engagement with the nose piece, the nut may be shaped as a hex head or other conventional nut head shape for engagement with a mating socket located on the nose piece. Accordingly, the present invention is not limited to the specific embodiments as illustrated herein, but is only limited by the following claims.

What is claimed is:

1. A tactile engaging wrenching tool adapted for use in the installation of a fastener to fasten a plurality of structures together, said fastener including a nut having a nut head with a surface for engagement with said wrenching tool and a screw having a wrench portion for engagement with said tool, said fastener being installed to fasten said structures together by inserting said fastener into a common opening in said structures and turning said screw relative to said nut to thereby deform said fastener in such a manner so as to fasten the structures together, said wrenching tool comprising:

a wrench adapter having a bottom end and a top end;
means associated with said wrench adapter bottom end for engaging the wrench portion of said screw to provide common only rotation of said screw and wrench adapter;
drive means for rotating said wrench adapter with sufficient torque to rotate said screw when said wrench adapter is engaged with the wrench portion of said screw and said nut is held stationary;
first connection means for connecting said drive means to said wrench adapter, said first connection means including a clutch assembly which provides common rotation of said drive means and said wrench adapter when said wrench adapter is engaged with said screw except when said nut is held stationary, said clutch assembly providing rotation of said drive means relative to said screw when said nut is held stationary and said wrench adapter is engaged with said screw so that said screw does not rotate relative to said nut;
a nose-piece having a bottom end and a top end;
means associated with said nose-piece bottom end for engaging said nut to hold said nut stationary and prevent rotation of said nut;
means for biasing said nose-piece bottom end against said nut head; and
second connection means for directly connecting said drive means to said wrench adapter and overriding said clutch assembly, said second connection means providing torquing of said wrench adapter by said drive means sufficient to turn said screw relative to said stationary nut head when said wrench adapter is engaged with said screw and said nose-piece is engaged with said nut head to deform said fastener to fasten said structures together, said second connection means being operable to provide the direct connection between said wrench adapter and said drive means only when said nose-piece is biased against said nut head by said nose-piece biasing means to thereby provide positive engagement of said nose-piece with said nut head prior to direct connection of said drive means to said wrench adapter.

2. A tactile engaging wrenching tool according to claim 1 wherein said screw wrench portion has flat surfaces and said means associated with said wrench adaptor bottom end for engaging said screw includes surfaces defining an opening of sufficient size and shape to mate with said screw wrench portion flat surfaces to provide said common only rotation of said screw and wrench adaptor.

3. A tactile engaging wrenching tool according to claim 1 wherein said nut head surface for engaging said tool is a recess shaped to receive a Phillips-type screw driver and wherein said means associated with said nose-piece for engaging said nut head recess is shaped to mate with said Phillips-type recess in said nut head.

4. A tactile engaging wrenching tool according to claim 3 wherein said nose piece includes a longitudinal conduit, said conduit being of sufficient size and shape to allow passage of said wrench adaptor therethrough.

5. A tactile engaging wrenching tool according to claim 1 wherein said clutch assembly includes a first clutch member connected to said drive means, said first clutch member having a conical shaped clutch surface, and a second clutch member connected to said wrench adaptor, said second clutch member having a conical shaped clutch surface for slidable engagement with said clutch surface on said first clutch member, said clutch assembly further including means for biasing said first and second clutch members together to provide transmission of torque from said drive means to said wrench adaptor.

6. A tactile engaging wrenching tool according to claim 1 wherein said direct drive means includes a drive shaft connected to said drive means and a transfer shaft connected to said wrench adaptor, said drive shaft having an end shaped to engage a mating end of said transfer shaft, said transfer shaft being movable to said engaged position only when said nose-piece is biased against said nut head by said biasing means.

7. A tactile engaging wrenching tool according to claim 5 wherein said clutch member biasing means includes a first clutch spring for biasing said first clutch member longitudinally against said second clutch member and a second clutch spring for biasing said second clutch member longitudinally against said first clutch member.

8. A tactile engaging wrenching tool according to claim 7 wherein said nose-piece biasing means includes a nose-piece spring which is movable between a nose-piece biasing position where said spring is compressed and an unbiased position where said spring is in an extended position.

9. A tactile engaging tool according to claim 8 wherein said clutch assembly and nose-piece biasing means are arranged so that when said nose-piece spring is compressed, said first and second clutch springs are also compressed to thereby gradually increase the amount of torque being transmitted from said drive means to said wrench adaptor via said clutch assembly prior to engagement of said direct drive means.

10. A tactile engaging wrenching tool adapted for use in the installation of a fastener to fasten a plurality of structures together, said fastener including a nut having a nut head with a surface for engagement with said wrenching tool and a screw having a wrench portion for engagement with said tool, said fastener being installed to fasten said structures together by inserting said fastener into a common opening in said structures and turning said screw relative said nut to thereby deform said fastener in such a manner so as to fasten the structures together, said wrenching tool comprising:

a wrench adapter having a bottom end adapted to engage the wrench portion of said screw to provide common only rotation of said screw and wrench adapter;

a nose-piece having a bottom end including means for engaging said nut head to hold said nut head stationary while said wrench adapter is engaged to and turns said screw to install said fastener;

means for biasing said nose-piece bottom end against said nut head to provide positive engagement of said nose-piece with said nut head, said biasing means being operable between biased and unbiased position;

a drive motor which is connectable to said wrench adapter to provide the torque necessary to turn said screw when said nut head is held stationary; and variable torque transfer means for connecting said drive motor to said wrench adapter, said variable torque transfer means being operable in a low torque transfer mode and a high torque transfer mode, said variable torque transfer means including clutch means operable in the low torque transfer mode to rotate said wrench adapter and said screw until said nut is engaged by said nose-piece, and said variable torque transfer means further including direct connection means operable in the high torque transfer mode to rotate said wrench adapter and said screw relative to said nut to fully set the fastener when said nose-piece biasing means is in said biased position.

11. A tactile engaging wrenching tool according to claim 10 wherein said nut head surface for engaging said tool is a recess shaped to receive a Phillips-type screw driver and wherein said means associated with said nose-piece for engaging said nut head recess is shaped to mate with said Phillips-type recess in said nut head.

12. An installation tool for installing fasteners of the type having a nut, an externally threaded screw extending through an internally threaded bore in the nut, wherein the screw must be rotated relative to the nut to install the fastener, the fastener being adapted for mounting in aligned openings through two workpieces to connect them together in overlapping outer and inner relation, said installation tool comprising:

a rotatable wrench adapter having an outer end for engaging the screw;

a nose-piece having an outer end for engaging the nut and holding it against rotation;

biasing means for biasing said nose-piece against the nut;

drive means having sufficient torque, when the nut is held against rotation by said nose-piece, to rotate said wrench adapter, and the screw when engaged by said wrench adapter, to fully set the fastener;

first connection means for connecting said drive means to said wrench adapter, said first connection means including a clutch assembly for providing common rotation of said drive means and said wrench adapter until the nut is engaged and held against rotation by said nose-piece, said clutch assembly thereafter providing rotation of said drive means relative to said wrench adapter so that the screw does not rotate relative to the nut; and second connection means for overriding said first connection means and positively connecting said drive means to said wrench adapter, said second connection means being operable when said nose-piece biasing means has biased said nose-piece against the nut to hold it against rotation, said second connection means thereafter directly transferring torque from said drive means to said wrench adapter to rotate the screw relative to the nut to fully set the fastener.

13. The installation tool of claim 12, wherein the outer end of the screw has a wrench engaging region in the shape of flat surfaces and the outer end of said wrench adapter has surfaces defining a socket of sufficient size and shape to engage the flat surfaces of the screw to provide rotation of the screw with said wrench adapter.

14. The installation tool of claim 12, wherein the nut has an outer surface with Phillips-type notches and the outer end of said nose-piece has protrusions for mating engagement with the Phillips-type notches of the nut to hold the nut against rotation when engaged by the protrusions of said nose-piece.

15. The installation tool of claim 12, wherein said wrench adapter is disposed concentrically within said nose-piece and said wrench adapter engages the screw before said nose-piece engages the nut.

16. The installation tool of claim 12, wherein the clutch assembly of said first connection means includes an upper clutch member connected to said drive means and having a conical shaped outer clutch surface, a lower clutch member connected to said wrench adapter and having a conical shaped inner clutch surface for engagement with the outer clutch surface of the upper clutch member, and clutch member biasing means for biasing the upper and lower clutch members together to provide transmission of torque from said drive means to said wrench adapter.

17. The installation tool of claim 16, wherein said second connection means includes a drive shaft connected to said drive means and a transfer shaft connected to said wrench adapter, the drive shaft having an end shaped to engage a mating end of the transfer shaft, the transfer shaft being engaged with the drive shaft only when said nose-piece biasing means has biased said nose-piece against the nut to hold it against rotation.

18. The installation tool of claim 16, wherein the clutch member biasing means includes a first clutch spring for biasing the upper clutch member downwardly against the lower clutch member, and a second clutch spring for biasing the lower clutch member upwardly against the upper clutch member.

19. The installation tool of claim 18, wherein said nose-piece biasing means includes a spring which is movable between a biased position where the spring is in a compressed position and said nose-piece is biased by the spring against the nut to hold it against rotation, and an unbiased position where the spring is in an uncompressed position and said nose-piece is not biased by the spring against the nut.

20. The installation tool of claim 19, wherein the clutch assembly and said nose-piece biasing means are arranged so that when the spring of said nose-piece biasing means is in a compressed position biasing said nose-piece against the nut, the first and second clutch springs of the clutch biasing means also are compressed, thereby increasing the amount of torque transferred from said drive means to said wrench adapter through the clutch assembly until said second connection means directly connects said drive means to said wrench adapter through mating engagement between the drive shaft and transfer shaft.

* * * * *